April 27, 1943.                T. BRINDLE                2,317,518
           LADDER AND LIKE WEBBING AND METHOD AND
              MECHANISM FOR PRODUCING THE SAME
                    Filed July 22, 1941        4 Sheets-Sheet 1

INVENTOR
Thomas Brindle
BY Barlow & Barlow
ATTORNEYS

April 27, 1943.　　　T. BRINDLE　　　2,317,518
LADDER AND LIKE WEBBING AND METHOD AND
MECHANISM FOR PRODUCING THE SAME
Filed July 22, 1941　　　4 Sheets-Sheet 3

INVENTOR
Thomas Brindle
BY Barlow & Barlow
ATTORNEYS

April 27, 1943.  T. BRINDLE  2,317,518
LADDER AND LIKE WEBBING AND METHOD AND
MECHANISM FOR PRODUCING THE SAME
Filed July 22, 1941  4 Sheets-Sheet 4

INVENTOR
Thomas Brindle
BY Barlow & Barlow
ATTORNEYS

Patented Apr. 27, 1943

2,317,518

UNITED STATES PATENT OFFICE 2,317,518

LADDER AND LIKE WEBBING AND METHOD AND MECHANISM FOR PRODUCING THE SAME

Thomas Brindle, Pawtuxet, R. I.

Application July 22, 1941, Serial No. 403,496

15 Claims. (Cl. 139—20)

This invention relates to improvements in ladder webbing composed of two bands of like length of woven material joined at intervals by cross straps, and improved mechanism for making the same.

In weaving this type of webbing, it is usual to weave the outer lengths of banding and cross straps as a simultaneous operation, one of the bands being positioned above the other; and an additional set or plurality of warp threads are provided and manipulated by well-known mechanism to be woven alternately into one band and then the other and with the portions of the warp bands extending from one band to the other forming the cross straps. This additional warp is woven for a portion of its length into one of the bands and then caused to cross over and to be woven for a short space of its length into the other band, and then floated for a distance equal to the width of the required webbing, and then crossed over and woven for a short extent into the other band, and then again floated and crossed to the other band, this operation being repeated throughout the weaving of this webbing, the floated portions of the warp threads forming the cross-straps. These bands are woven usually in contiguous relationship to each other; and the extent of the crossing between the woven-in portions of the warp threads is usually short and must be severed in order that a separation of the bands can be had. This severing leaves only short end portions of the cross-straps interwoven into the outer bands and at best does not always provide as strong a tying-in of the joining cross-straps to the outer bands as is desired.

The operation of severing the connecting or joining free warp portions entails a considerable amount of labor in the finishing off process of the webbing and adds considerably to the cost of production. Further, the severed portions necessarily leave a frayed edge of warp ends extending from the outer band at the point of the severing.

An object of this invention is to provide a woven webbing of the above character in which the aforementioned severing will be entirely eliminated and in which the tying-in of the cross-straps will be greatly strengthened.

Another object of the invention is to provide an improved loom mechanism by which the improved webbing may be woven in a practical manner.

Another object of the invention is to provide an improved mechanism for manipulating the warp threads to be woven-in alternately into the outer bands of the webbing.

With these and other objects in view the invention consists of certain novel features of construction, as will be more fully described and particularly pointed out in the appended claims.

In the accompanying drawings:

Fig. 1 illustrates a fragmental portion of a loom embodying features of my invention;

Figures 7, 18, 19:
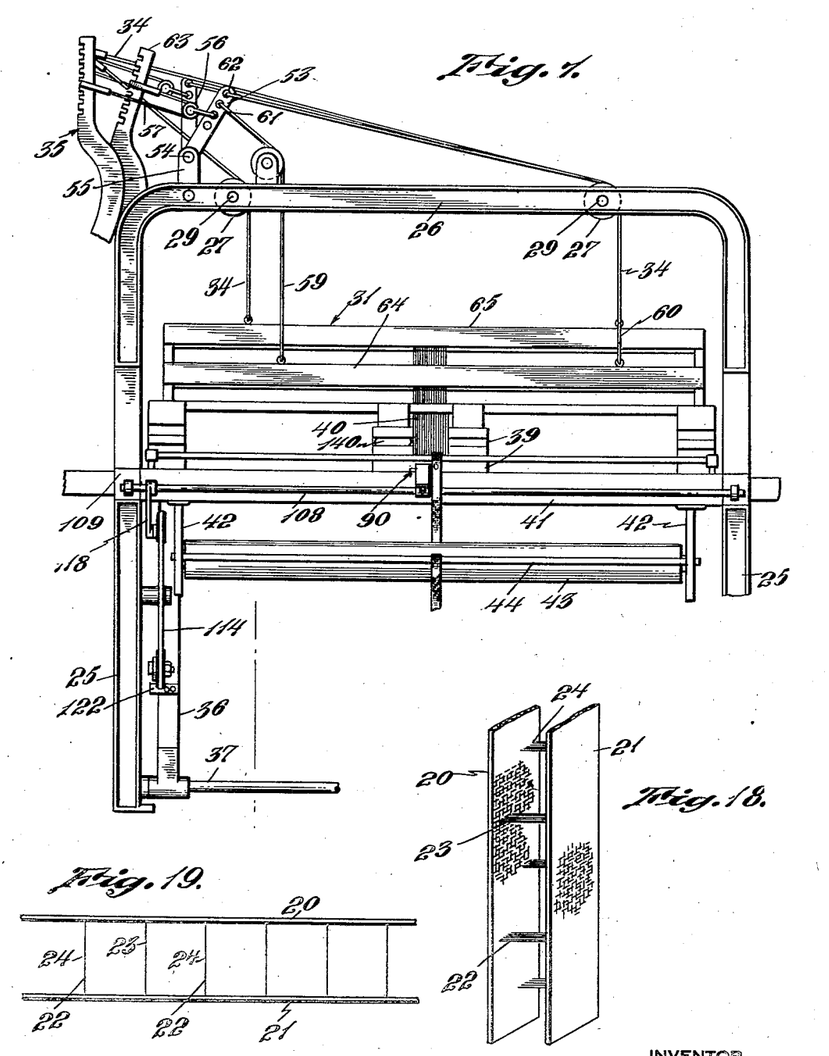
Fig. 7 is a perspective view showing an assembled mechanism for controlling the warp threads of the cross strap.
Fig. 18 illustrates in perspective a fragmental portion of the ladder webbing spaced apart.
Fig. 19 also illustrates a fragmental portion of the webbing and cross strap standing at right angles to the outer band.
Figures 7, 8, 9, 10, 11, 12:
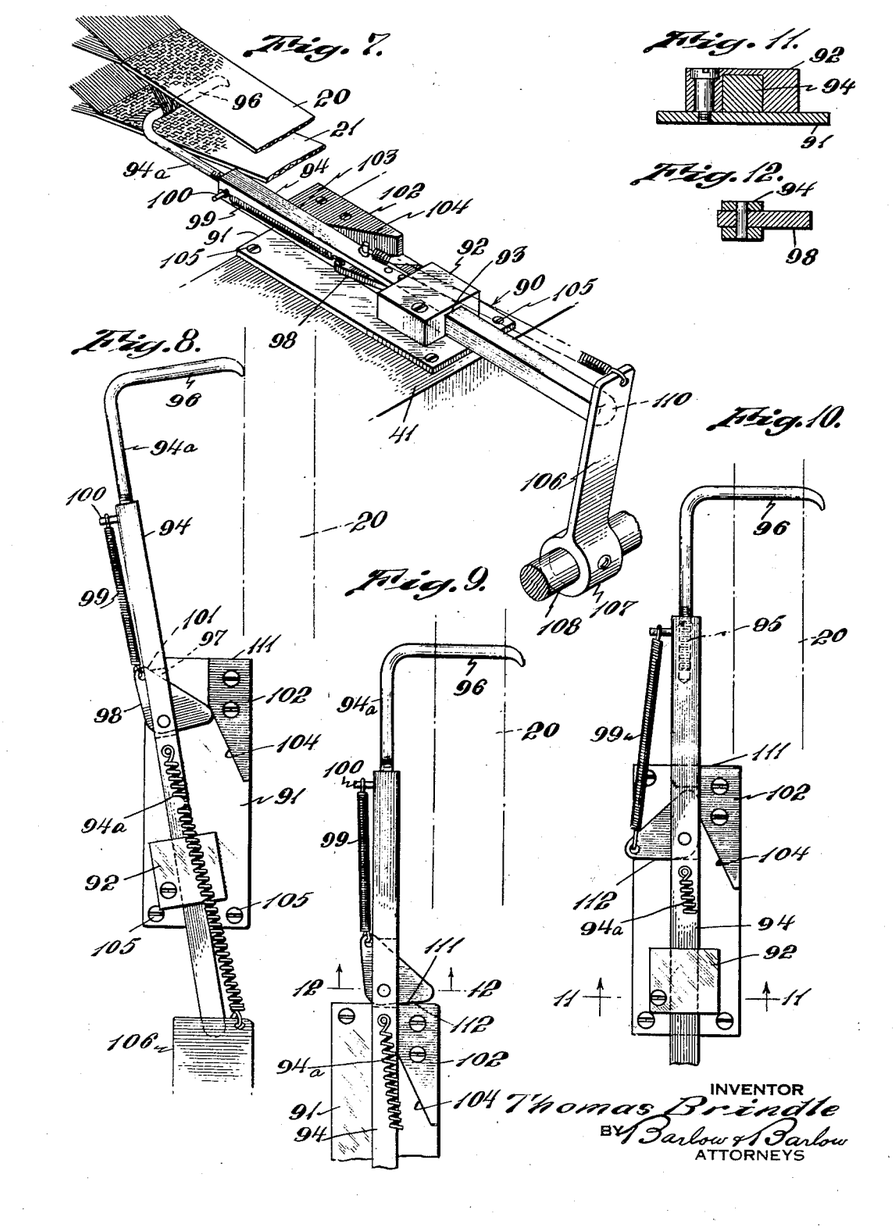
Figs. 8, 9, and 10 are plan views of the device shown in Fig. 7, showing the different positions of the warp threads controlling mechanism.
Fig. 11 is a sectional view taken substantially on line 11—11 of Fig. 10.
Fig. 12 is a sectional view taken substantially on line 12—12 of Fig. 9.

In carrying out my invention, I provide for weaving simultaneously the outer banding or bands 20 and 21 of the webbing in substantially spaced relation one over the other, which spacing of the outer bands in the weaving thereof permits ready detection of any faulty weaving in the lower outer band. These outer bands 20 and 21 are joined by cross-straps 22. The cross-straps herein shown consists of two rows 23 and 24, those straps in one row lying in staggered relationship to those in the other row, as clearly shown in perspective in Fig. 18 of the drawings. However, a single row, or a plurality of rows of cross-straps, with the straps of each row positioned in the same plane, may be provided if desired.

The weaving of the outer bands 20 and 21 may be effected in any of the well-known types of looms usually employed for making such webbing; and that herein illustrated fragmentally in Fig. 1 and on which is embodied my improved mechanism adapted to make the improved webbing, is of a usual construction, having the end uprights or risers 25 provided at the upper ends with the usual arch member 26. This arch 26 has two sets of spaced sheaves or pulleys 27, freely rotatable on pins 29. This loom is provided with a plurality of harnesses, herein designated generally by the numeral 31; and the harnesses, actuated to manipulate the warp threads 32 and 33 forming with weft threads the outer bands 20 and 21 of the webbing, are connected by means of flexible connectors 34, each passing over a sheave 27 and secured at one end to a harness frame and at the other end to one of a plurality of levers or harness jacks, generally designated 35. These harness jacks constitute parts of a well-known type of shedding mechanism, there being one harness jack for each harness frame and each being individually controllable and actuated by mechanism not shown but so well-known in the art as to require no further illustration or description to clearly understand the invention.

This loom also has the usual lay supported on sword 36 rockably mounted on shaft 37 and carries the usual spaced shuttle races 39 and reed 40. From the breast beam 41 depend brackets 42 provided with suitable bearings for supporting the webbing-take-up rolls 43 and 44.

The harness which is employed for weaving the outer bands is provided with heddles of the type employed in weaving two webbings simultaneously and has spaced eyes through which pass the warp threads 32 forming one of the outer bands and warp threads 33 forming the other band.

Figure 13:
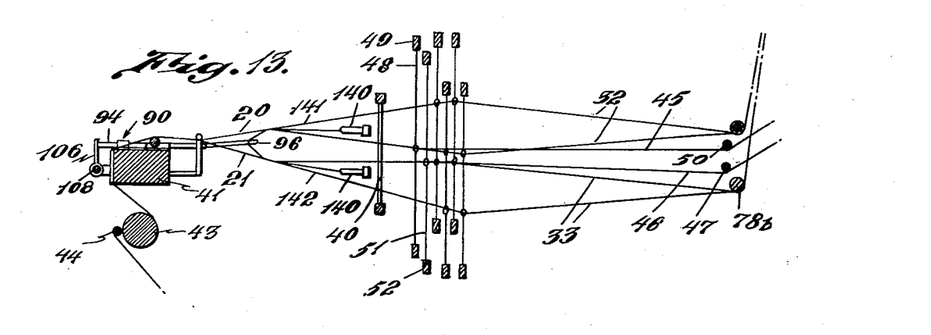
Fig. 13 illustrates diagrammatically the relationship of the several groups of warp threads to each other and to the mechanism for controlling the cross-strap warp threads.
Figure 14:
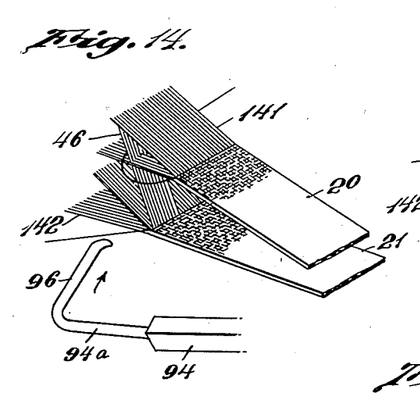
Figs. 14, 15, and 16 each show perspectively and diagrammatically several stages of the relationship between the cross threads forming the cross straps to the outer band of the weaving.
Figure 15:
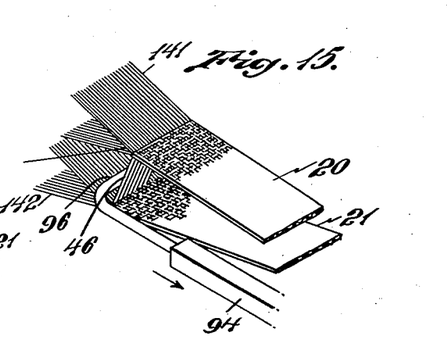

In Fig. 13, I have shown diagrammatically a plurality of these harnesses employed to form the outer bands 20 and 21, which group of harnesses may appear to be indicative of a particular design of weave. However, the showing is merely illustrative and is not intended to show any particular weave design.

In accordance with this invention, I provide an additional group or plurality of warp threads for each row of cross-straps 22. In the present showing, a plurality of warp threads 45 is provided for forming one row of cross-straps, and a separate plurality of warp threads 46 is provided and separately actuated for forming the other row of cross-straps. The additional plurality of warp threads is manipulated, in a manner to be hereinafter described, to be woven-in alternately into one and then into the other of the outer bands of the webbing. The group of threads 45 extends from a source of supply (not shown) to beneath a rod 50 through the heddles 48 of the harness 49, then through the reed 40 to be incorporated into the webbing to be formed. The group of threads 46 also extends from the source of supply (not shown) beneath the rod 47, through the heddles 51 of the harness 52, then through the reed 40 to be also incorporated in the webbing to be formed. It will be noted that the heddles of the harnesses 49 and 52 are of the type having only one thread opening therein.

In order to actuate the harnesses 49 and 52 in a manner to manipulate the warp threads forming the cross-straps of the webbing to be woven-in alternately into the outer bands 20 and 21, a plurality of arms 53 is provided; and each arm is pivotally mounted on a pin shaft 54 supported in brackets 55 fixed to the arch 26. Each arm 53 which is to be connected to a harness (there being one arm for each of the harnesses 49 and 52) has a sheave 56 secured thereto; and a flexible connector 57 has an end secured to one of the harness jacks 35 and the other end to another of the harness jacks 35. This particular connection provides a bight in the flexible connector 57 which is positioned to extend about the sheave 56. Each harness 49 and 52 is connected to its respective arm 53 by means of flexible connectors 59 and 60. One end of each connector is secured to the harness and the other to the arm 53 as at 61 and 62. There is provided on these arms openings for adjusting the position of the harnesses. I have herein shown but one harness for each group or plurality of warp threads. However, the number of harnesses may be varied to provide any particular weaving-in of the groups of warp threads, and each of such number of harnesses will be hooked up to the shedding mechanism as above described.

It will now be apparent that by a proper selection or design of harness chain, usually employed in harness shedding mechanism of the type herein disclosed, one of the harness jacks, to which the connector 57 is secured, may be caused to operate at intervals to position the harness operatively connected thereto at a location to position the warp threads controlled thereby to be woven-in in either of the outer bands 20 and 21. When one of the harness jacks 35, particularly designated 63, is caused to be in the position shown in Fig. 1, then the harness indicated as 64 will be at a location for the threads controlled thereby to be woven in the lower positioned outer band of the webbing. When the harness jack 63 is caused to assume its most forwardly position, in line with the group of jacks indicated by numeral 35, then the harness 64 will be at a level with the harness indicated as 65, which will position the threads controlled thereby to be woven into the upper positioned outer band. The other of said harness jacks 35, to which the flexible connector 57 is also connected, is actuated in a usual manner in accordance with the design of weave in which woven-in threads of the cross-straps are to be incorporated into the outer bands. It is to be understood that the motion above described will be similar for each of such harnesses that may be provided for each group or plurality of warp threads forming the cross-straps of the webbing.

In my improved webbing, each alternate crossing of the plurality of warp threads 45 and 46 from one outer band to the other provides the joining cross-straps; and to provide a sufficient length of these warp threads at each crossing, the rods 47 and 50 are rockably mounted to swing to permit a slack to be had in the warp threads passing beneath and engaged thereby. The rod 47 is secured to the lever 66 and link 67, both fixed to a shaft 68 journaled in the bearings 69 supported on the frame of the loom. The lever 66 is of the bell-crank type, and the arm 70 thereof is connected by means of a flexible connector 71 to an arm 72 similarly mounted and identical to the arms 53 heretofore described. A sheave 73 is secured to this arm 72, and a flexible connector 74 has one of its ends secured to a harness jack 75 of the group of harness jacks 35 and the other end thereof secured to another harness jack 76. The rod 50 is of less length than the rod 47 and is mounted to swing between the levers 66 and 67 and is secured at one end to a link 77 fixed to one end portion of a tubular member 78 and at the other end to an arm 79 of a bell crank type lever 80 secured to the other end portion of the tubular member. The arm 81 of the lever 80 is connected to two of the group of harness jacks, in a manner similar to the lever 66, by connector 82, arm 83, sheave 84, and connector 85. The tubular member 78 is positioned on the shaft 68 and is rotatable thereon and provides a guide roll for the warp threads of the upper outer band; and a rod 78b provides a guide for the warp threads of the lower positioned outer band.

Figures 2, 3, 4, 5:
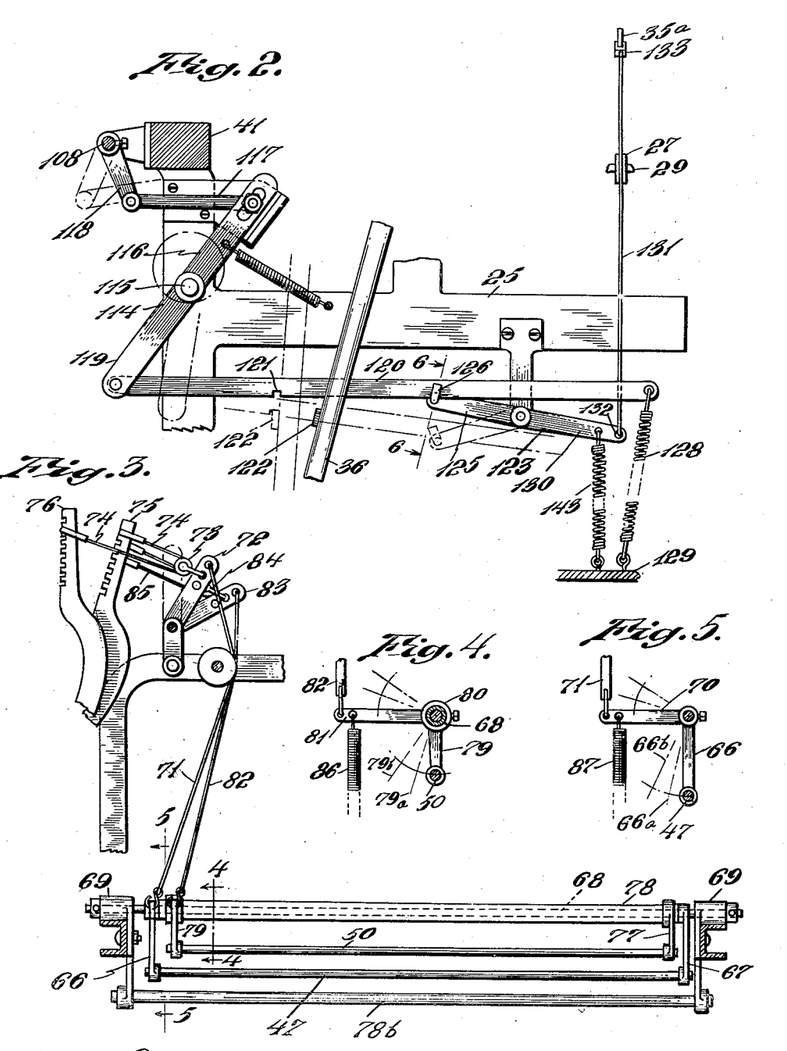
Fig. 2 is a partial side elevational view of the loom illustrated in Fig. 1, showing mechanism forming part of this invention.
Fig. 3 illustrates a fragmental portion of a harness shedding mechanism as employed for partially controlling the cross strap warp threads.
Fig. 4 is a sectional view taken on line 4—4 of Fig. 3.
Fig. 5 is a sectional view taken on substantially line 5—5 of Fig. 3.
Figure 6:
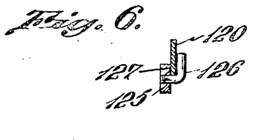
Fig. 6 is a sectional view taken substantially on line 6—6 of Fig. 2.

It will be apparent that in the above manner of connecting the rods 47 and 50, which may be termed slackener rods, the throw of either one of the two harness jacks to which each slackener rod is operatively connected will cause a relative movement of said rod equal to half the amount of the combined movement of both of said harness jacks. As illustrated in Figs. 4 and 5, the throw of one of the harness jacks to which the connector 71 or 82 may be operatively connected will move the rods 47 and 50 to the position indicated by the dot and dash lines 66a—79a. And the throw of the other companion harness jacks of those first moved will further move the rods 47 or 50, as the case may be, to the position indicated by the dot and dash lines 66b and 79b. By arranging for the slackener rods 47 and 50 to be moved in the manner above described, only half the required length of slack in the cross-strap-forming warp threads is furnished at the crossing of the threads from one outer band to the other which provides for a better weaving condition. When the warp threads have crossed from one outer band to the other and been incorporated therein by a weft pick, the companion harness jack to the one moved is actuated to complete the swing of the slackener rod, and the additional amount of slack in the warp threads is drawn forwardly of the shed of the outer bands by a mechanism about to be described. A coiled pull spring 86 secured to the arm 81 of lever 80, and a coiled pull spring 87 secured to the arm 70 of the lever 66, both springs being suitably anchored to exert a pull on the respective levers to which they are secured, resiliently return the slackener rods to initial position to tension the warp threads engaged thereby.

The mechanism operable to draw or pull the slackened portion of the warp threads forming the joining cross-straps comprises in part an attachment herein generally designated 90 consisting of a base plate 91 on which is pivotally mounted a bearing block 92 having a recess 93 therein slidably receiving a rod 94. This rod 94 has an extension 94a thereon threadingly secured thereto as at 95 and provided at the free end extremity thereof with a hook formation 96 positionable between the outer bands of the webbing being woven. This rod 94 is also provided with a slot 97 in which a cam follower 98 is pivotally mounted. A pull spring 99 has one end secured to the cam follower 98 and the other end thereof anchored by means of a pin 100 to the rod 94. This resiliently holds the cam follower against the edge 101 of the recess 97. A block 102 having a straight edge 103 and a cam surface 104 is secured to the base plate 91. This assembly is secured to the breast beam of the loom by means of screw bolts 105 at a location adjacent to the edge of the webbing to be woven. In order to position the hook formation 96 at a location to engage the warp threads to draw the slack provided therein, a lever arm 106 having an apertured boss 107 is secured to a rock shaft 108 finding bearing in the brackets 109 extending forwardly from the breast beam of the loom. This arm 106 is positioned at a location to engage the end extremity 110 of the rod 94 and when swung by the movement of the rock shaft 108 will move the rod 94 at a location to be in position to engage the crossed warp threads. In moving the rod 94 towards the fell of the webbing, the cam follower 98 will ride upon the cam surface 104 and cause the rod 94 to move away from the adjacent edge of the webbing and remove the hook formation from between the outer bands 20 and 21. Further movement of the rod will cause the cam follower 98 to extend beyond the outer edge 111 of the block 102 and permit the rod to be moved laterally to position the hook formation between the outer bands 20 and 21 and forwardly of the crossed warp threads. This lateral movement is caused by the action of the pull spring 94a anchored at one end to the rod 94 and at the other end to the arm 106 at a location to exert a force on the rod 94 in a direction towards the webbing (see Figs. 8, 9, 14, and 15).

Figure 16:
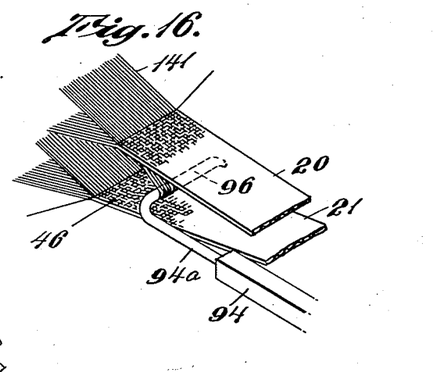
Figure 17:
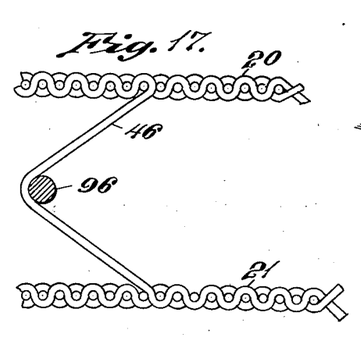
Fig. 17 illustrates diagrammatically the woven-in relationship of the joining cross strap to the outer bands of the webbing.

The return of the arm 106 to its initial position will cause the pull spring 94a to exert a resilient force on the rod 94 to withdraw the hook formation from its forward position with the warp threads engaged thereby. This movement of the rod 94 and the direction of the force of the pull spring thereon will cause the edge 112 of the cam follower to engage and be moved by the edge 111 of the block 102 (see Fig. 9) to be swung about its pivot to position this edge 112 flush or substantially so with the adjacent edge of this rod 94 (see Figs. 7, 10 and 16). This action will cause the side edge of the rod to engage and be guided by the edge 103 of the block 102 in its withdrawal movement from its forward position to position the slack portion of the warp threads forwardly of the fell of the bands. The resilient withdrawal of the rod 94 avoids breaking of the threads, which would result should the pull on the slack threads be too suddenly exerted thereon.

In order that the just above described mechanism may operate in proper time relation with other moving elements of the loom, a lever 114 is pivotally mounted to the side frame of the loom as at 115, see Figs. 1 and 2. To the arm 116 of this lever 114 is pivotally secured a link 117, the other end of which is in turn pivotally secured to a link 118 fixed to and depending from the rock shaft 108. As the lever 114 is caused to be moved about its pivot 115, motion of the arm 116 will be transmitted to the rock shaft 108 by the linkage just described.

Pivotally secured at one end portion to the lower portion of the arm 119 of the lever 114 is an elongated member 120 provided with a notch 121 adapted to receive therein the end portion of a narrow plate 122 fastened to the lay sword 36. This notch 121 is kept out of the path of movement of the plate 122 by a lever 123 pivotally supported from a bracket 124 depending from the side frame of the loom. On the end of the arm 125 of the lever 123 extends a pin 126 with the end thereof bent upwardly which, with the adjacent surface of the lever, provides a recess 127 in which the member 120 rests. A pull spring 128, secured at one of its ends to the end portion of the member 120 and at its other end at a convenient location such as the floor 129, resiliently secures the member 120 in the recess 127. The other end 130 of the lever 123 is connected to the harness mechanism by means of a flexible connector 131 passing over one of the sheaves 27 and having one end fixed to the lever as at 132 and the other end thereof to one of the harness jacks 35 as at 133.

Actuating the particular harness jack herein designated 35a to which the connector 131 is secured will move the lever 123 about its pivot and position the arm 125 thereof at a location, as illustrated in dot and dash lines in Fig. 2 to permit the member 120 at the urging of the spring 128 to be positioned at a location to place the notch 121 in the path of movement of the plate 122. During the forward movement of the lay sword 36, the notch 121 will register with and receive therein the extending portion of the plate 122. Movement of the lay sword in the opposite direction will carry the member 120 therewith and swing the lever 114 about its pivot to cause motion in the rocker shaft 108 as above described. A further actuation of the harness jack 35a will return the lever 123 and member 120 to initial position.

It is to be understood that there is a multiplicity of the mechanism generally designated 90 furnished with each loom, there being one for each webbing woven on the loom.

Each cross strap of the ladder webbing is of greater length than the distance of the space therebetween in order that the slats supported on these cross straps, when the webbing is employed for making Venetian blinds, shall overlap each other when the blind is closed. However, when two rows of cross-straps are provided in the webbing with the cross straps in one row being in staggered relation with those in the other row, then the space between each cross-strap of a row is greater than the length of the cross-straps. This is illustrated in Fig. 19, in which the space between the cross-straps 22 in the row 24 is a greater distance than the length of each cross-strap. In my improved webbing the woven-in portions of the cross straps extend for this entire distance which results in a better tying-in and provides a stronger outer band.

The operation of the several parts of the improved mechanism of the loom for weaving the improved webbing has been given in connection with the detailed description thereof, and a brief general description of the operation of the mechanism as a whole will suffice to clearly understand its mode of operation. It will be assumed that the loom is supplied with the necessary warp threads properly drawn into the several harnesses for forming the two outer bands of the webbing and that the additional plurality of warp threads 45 and 46 are also properly drawn through their respective harnesses, etc. The loom is set into motion, and the weft-carrying shuttles 140 are set into motion to carry the weft thread in the usual manner through the sheds, here particularly designated 141 and 142, forming the two outer bands of the webbing (see Figs. 13, 14, 15, and 16). After a predetermined length of weaving of the outer bands 20 and 21 with the additional warp threads woven into one of the outer bands, the shedding mechanism is caused to actuate a harness jack. Let it be assumed that the jack actuated is one of the two which are operatively connected to the harness 52 which controls the warp threads 46 forming the row of joining cross straps 23 (see Fig. 18). Actuating this particular harness jack will cause the harness 52 to be raised from the position shown in Fig. 13 to a location to position the warp threads 46 to be in the upper portion of the shed 141 of the band 20. Just prior to or simultaneously with the actuation of this particular harness jack, the shedding mechanism will actuate the harness jack designated 76 and raise the arm 72 secured thereto to the position shown in Fig. 3. This action will swing through the connection 71 and lever 66, the slackener rod 47 to the position indicated by the numeral 66a in Fig. 5 which will cause a slack in the warp threads substantially one half the required length for the joining cross straps about to be formed. Further movement of the loom will cause the shuttle to pass through the shed 141 and lay a weft thread in the shed and between the now raised warp threads 46 and the reed 40. On the forward movement of the lay to beat in this weft thread, a change of shed takes place; and the particular harness jack 35a is actuated to lower the arm 125 of the lever 123 which permits, in a manner heretofore described, the registering and engagement of the notch 121 with the plate 122. The rearward movement of the lay will, as before described, actuate the lever 114 to position the hook formation 96 on the rod 94 between the outer bands 20 and 21 and forward of the warp threads 46, (see Fig. 15). During the next beat up of the lay, the harness jack 35a is again actuated, this time in a manner which permits the lowering of the arm 130 urged by the pull spring 143, and disengages the notch 131 from the plate 122, which will permit the spring-loaded lever 114 and the arm 106 operatively connected thereto to return to initial position. The shedding mechanism also during this beat up of the lay actuates the harness jack 75 which positions the lever 72 at the location shown in dot and dash lines in Fig. 3. This action swings the lever 66 to the position shown in dot and dash lines 66b in Fig. 5, which is the most forwardly position of the rod 47, which position provides the full amount of slack required for forming the cross-straps. Upon the return of the arm 106 to its initial position, the spring 94a will exert a pull on the rod 94 and withdraw the same to position the slackened portion of the warp threads forwardly of the fell of the bands (see Fig. 16). Further motion of the loom will, through the manipulation of the harnesses as previously described, cause the warp threads to be woven into the outer band 20 the entire distance of the space between the next subsequent alternate crossing of this plurality of warp threads into the outer band 21; and a repeat of the above operation will take place through the action of the proper elements. During the woven-in period of the warp threads, the shedding mechanism will be actuated to permit the slackener rod 47 to return under the pull of the spring 87 to initial position. The motions above described will take place for each plurality of warp threads forming the joining cross straps.

The initial amount of slack provided in the warp threads forming the cross straps is substantially equal to the spacing of the outer band 20, 21 during the weaving thereof to provide for better weaving conditions.

I claim:

1. A method of forming ladder webbing and the like which comprises weaving two outer bands in substantial spaced relation one over the other, providing a set of additional warp threads which form cross-straps, manipulating said warp threads to be woven-in alternately into one of said bands, then into the other, further manipulating said warp threads to provide a slack therein at the crossing of the said warp threads from one band to the other to provide a length of slack warp threads equal to the spacing of said bands, securing said warp threads into the band with a weft thread, further manipulating said warp threads to provide an additional slack therein to equal with said first slack portion a length of warp threads equal to the length of the predetermined length of cross-straps, and pulling all of said slack warp threads to position the same forwardly of the fell of the bands during the subsequent interweaving of said woven-in portion thereof into the said bands.

2. In combination with a loom arranged for weaving ladder webbing in which warp threads which form the cross-straps of the webbing are manipulated to be woven-in alternately into one and then into the other of the outer bands of the webbing, means for causing a slack in the said warp threads when crossing from one of said bands to the other, a rod means for slidably and pivotally mounting said rod, said rod having a hook formation thereon positionable between the outer bands of the webbing at a location to engage said warp threads, resilient means for moving said rod towards the breast beam of the loom to resiliently pull said slack portion forwardly of the fell of the bands, and cam means in part carried by said rod for withdrawing said hook formation from between said bands.

3. In combination with a loom arranged for weaving ladder webbing in which warp threads which form the cross-straps of the webbing are manipulated to be woven-in alternately into one and then into the other of the outer bands of the webbing, means for causing a slack in the said warp threads when crossing from one of said bands to the other, a rod means for slidably and pivotally mounting said rod, said rod having a hook formation thereon positionable between the outer bands of the webbing at a location to engage said warp threads, resilient means for moving said rod towards the breast beam of the loom to resiliently pull said slack portion forwardly of the fell of the bands, a cam surface secured to said breast beam and a cam follower carried by said rod and engageable with said cam surface for withdrawing said hook formation from between said bands.

4. In a loom arranged for weaving ladder webbing in which warp threads are manipulated to be woven-in alternately into one and then into the other of the outer bands of the webbing to form the cross-straps thereof, means for causing a slack in the said warp threads when crossing from one of said bands to the other, a rod, means for slidably mounting said rod on the breast beam of the loom, said rod having a hook formation thereon positionable between the outer bands of the webbing at a location to engage the said warp threads at the crossing thereof from one of said bands to the other and resilient means for moving said rod and hook formation in a direction to resiliently pull said slack portion of the warp threads forwardly of the fell of the bands.

5. In combination with a loom having a warp shedding mechanism and arranged for weaving ladder webbing in which warp threads which form the cross-straps of the webbing are manipulated to be woven-in alternately into one and then into the other of the outer bands of the webbing, means engaging said warp threads and manipulated by said shedding mechanism and first operable for causing a slack in said threads to provide a length of said threads substantially less than the full length required for said cross-straps and subsequently operable to provide an additional slack in said threads to provide a length of threads which will with the first of said slack portion equal the length of threads required for said cross-straps, and resilient means for resiliently pulling all of said slack portion of threads in a direction to position the same forwardly of the fell of the bands.

6. A method of forming ladder webbing and the like which comprises weaving two outer bands in substantial spaced relation one over the other, providing a set of additional warp threads which form cross-straps, manipulating said warp threads to be woven-in alternately into one of said bands, then into the other, further manipulating said warp threads to provide a slack therein at the crossing of the said warp threads from one band to the other to provide a length of slack warp threads equal to the spacing of said bands, securing said warp threads into the band introduced with a weft thread, further manipulating said warp threads to provide an additional slack therein to equal with said first slack portion a length of warp threads equal to the length of the predetermined length of cross-straps, and resiliently pulling all of said slack warp threads to position the same forwardly of the fell of the bands during the subsequent interweaving of said woven-in portion thereof into the said bands.

7. In combination with a loom arranged for weaving ladder webbing in which warp threads which form the cross-straps of the webbing are manipulated to be woven-in alternately into one and then into the other of the outer bands of the webbing, means for causing a slack in the said warp threads when crossing from one of said bands to the other, and additional means including a slidably and pivotally mounted rod having a hook formation thereon positionable between the outer bands of the webbing at a location to engage said warp threads, a lever, a coil spring secured at one end to said lever and at the other end to said rod and means for moving said lever to pull said spring to exert a resilient force on said rod to resiliently pull said slack portion forwardly of the fell of the bands.

8. In combination with a loom arranged for weaving ladder webbing in which warp threads which form the cross-straps of the webbing are manipulated to be woven in alternately into one and then into the other of the outer bands of the webbing, means for causing a slack in the said warp threads when crossing from one of said bands to the other, a plate fixed to the breast beam of the loom, a bearing pivotally mounted on said plate and a rod slidably mounted in said bearing and having a hook formation thereon positionable between the outer bands of the webbing at a location to engage said warp threads, and resilient means for moving said rod towards the breast beam of the loom to resiliently pull said slack portion rearwardly of the fell of the bands.

9. In combination with a loom arranged for weaving ladder webbing in which warp threads which form the cross-straps of the webbing are manipulated to be woven-in alternately into one and then into the other of the outer bands of the webbing, means for causing a slack in the said warp threads when crossing from one of said bands to the other, a member engageable with said threads and resilient means connected to and actuating said member for resiliently pulling said slack portion towards the breast beam of the loom to position said slack portion forwardly of the fell of the bands.

10. In combination with a loom arranged for weaving ladder webbing in which warp threads which form the cross-straps of the webbing are manipulated to be woven-in alternately into one and then into the other of the outer bands of the webbing, means for causing a slack in the said warp threads when crossing from one of said bands to the other, a rod having a hook formation thereon positionable to engage said warp threads at the fell of the bands, and resilient means for moving said rod to pull the slack portion of said warp threads forwardly of the fell of the bands.

11. In combination with a loom arranged for weaving ladder webbing in which warp threads which form the cross straps of the webbing are manipulated to be woven-in alternately into one and then into the other of the outer bands of the webbing, means for causing a slack in the said warp threads when crossing from one of said bands to the other including a movable rod positionable to engage said warp threads intermediate the source of supply and the fell of the bands and movable towards or away from said source of supply to slacken or tension said warp threads, and a member for engaging said warp threads at the fell of the bands, and resilient means connected to and actuating said member, to resiliently pull and position said slack portion of the warp threads forwardly of the fell of the said bands.

12. In a loom arranged for weaving ladder webbing in which warp threads are manipulated to be woven-in alternately into one and then into the other of the outer bands of the webbing to form the cross-straps thereof, means for causing a slack in the said warp threads when crossing from one of said bands to the other, a rod having a hook formation thereon positionable between the outer bands of the webbing at a location to engage the said warp threads at the crossing thereof from one of said bands to the other, means for slidably mounting said rod, and means including a spring for resiliently moving said rod in a direction to pull said slack portion of the warps forwardly of the fell of the bands.

13. In combination with a loom arranged for weaving ladder webbing in which warp threads which form the cross-straps of the webbing are manipulated to be woven-in alternately into one and then into the other of the outer bands of the webbing, means for causing a slack in the said warp threads when crossing from one of said bands to the other, a rod having a hook formation thereon positionable between the outer bands of the webbing at a location to engage said warp threads, means for slidably and pivotally mounting said rod, a lever, resilient means connecting said rod and lever, and means for moving said lever to resiliently pull said slack portion forwardly of the fell of the bands.

14. In combination with a loom having a breast beam and arranged for weaving ladder webbing in which warp threads which form the cross-straps of the webbing are manipulated to be woven-in alternately into one and then into the other of the outer bands of the webbing, means for causing a slack in the said warp threads when crossing from one of said bands to the other, a bearing, means for pivotally mounting said bearing, a rod having a hook formation thereon positionable between the outer band of the webbing at a location to engage said warp threads, means for slidably mounting said rod in said bearing and resilient means for slidably moving said rod towards the breast beam of the loom to resiliently pull said slack portion forwardly of the fell of the bands.

15. In combination with a loom arranged for weaving ladder webbing in which warp threads which form the cross-straps of the webbing are manipulated to be woven in alternately into one and then into the other of the outer bands of the webbing, means for causing a slack in the said warp threads when crossing from one of said bands to the other, a plate fixed to the breast beam of the loom, a bearing pivotally mounted on said plate, a rod slidably mounted in said bearing, and having a hook formation thereon positionable between the outer bands of the webbing to engage said warp threads, a cam carried by said plate, a cam follower carried by said rod and engageable with said cam surface for grinding said rod in a direction for withdrawing said hook formation from between said bands.

THOMAS BRINDLE.

CERTIFICATE OF CORRECTION.

Patent No. 2,317,518. April 27, 1943.

THOMAS BRINDLE.

It is hereby certified that error appears in the printed specification of the above numbered patent requiring correction as follows: Page 5, first column, line 33, claim 2, after "rod" insert a comma; page 6, second column, line 54, claim 15, for "grinding" read --guiding--; and that the said Letters Patent should be read with this correction therein that the same may conform to the record of the case in the Patent Office.

Signed and sealed this 15th day of June, A. D. 1943.

(Seal)

Henry Van Arsdale,
Acting Commissioner of Patents.